July 29, 1930.  J. W. SEIDEN  1,771,941
AIRPLANE BRAKE
Filed Feb. 26, 1929   2 Sheets-Sheet 1
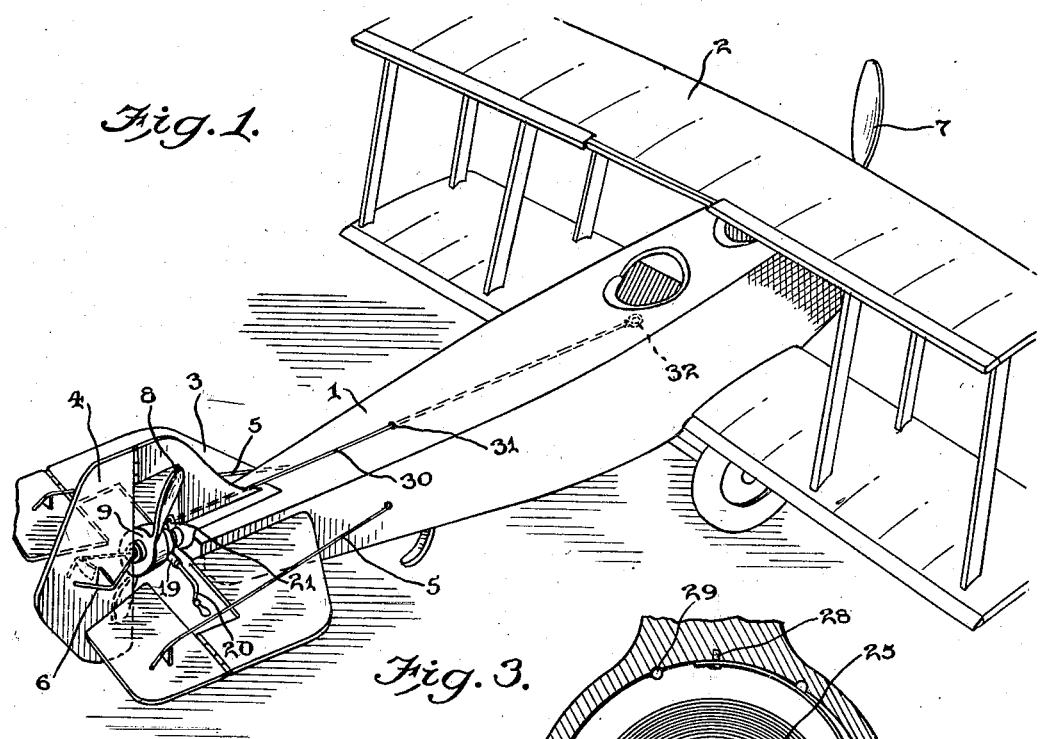
Fig.1.
Fig.3.
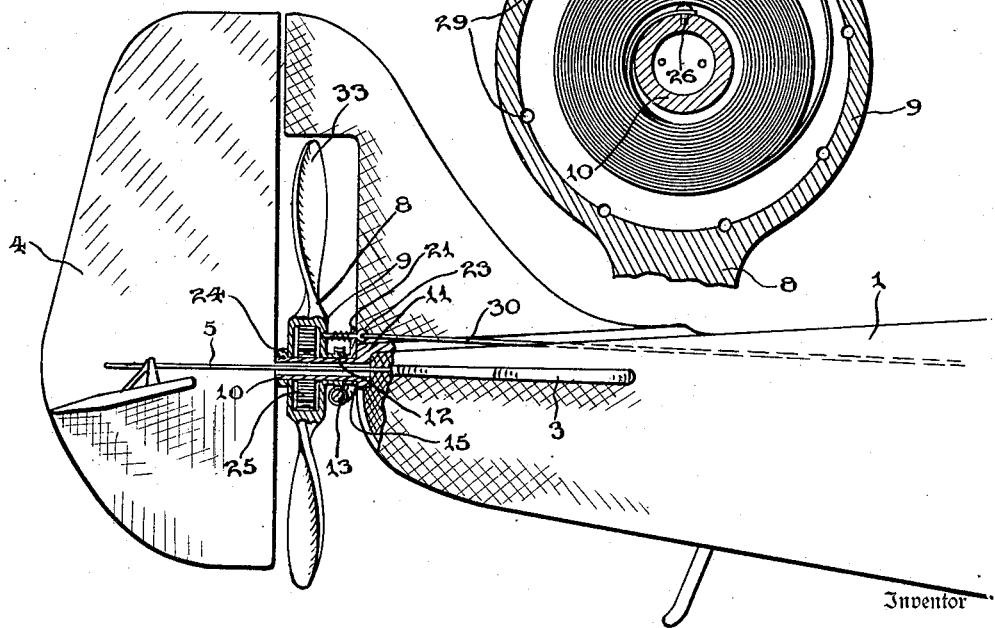
Fig.2.
Inventor
J. W. Seiden,
By Linton, Kellogg Smith
Attorneys July 29, 1930.                J. W. SEIDEN                 1,771,941
                             AIRPLANE BRAKE
                   Filed Feb. 26, 1929        2 Sheets-Sheet 2
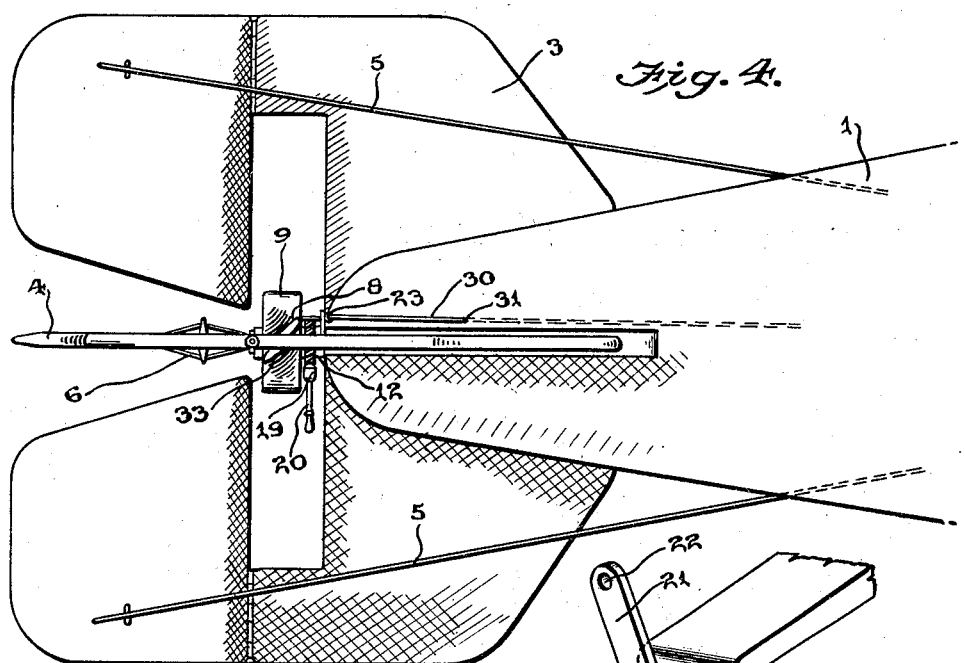
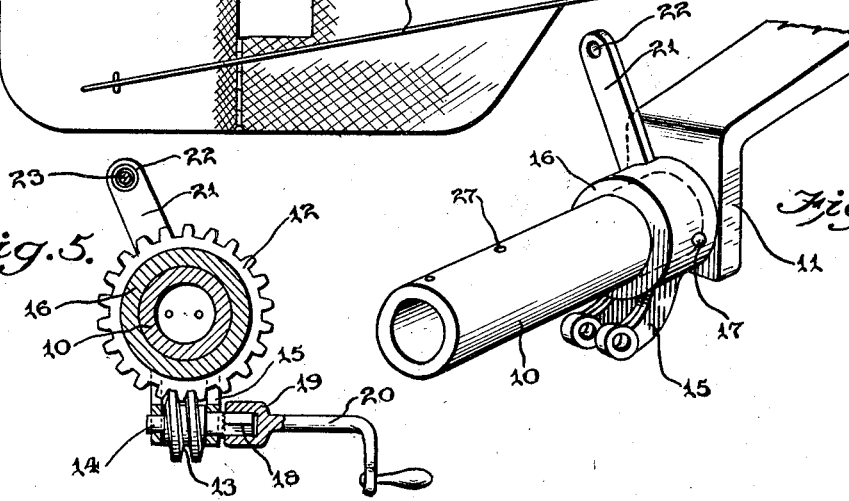
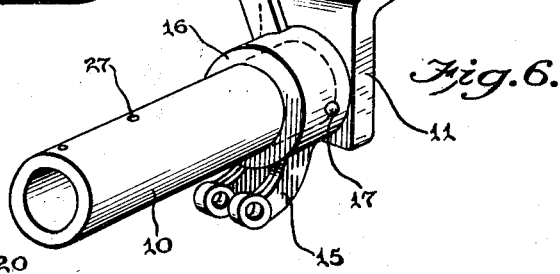
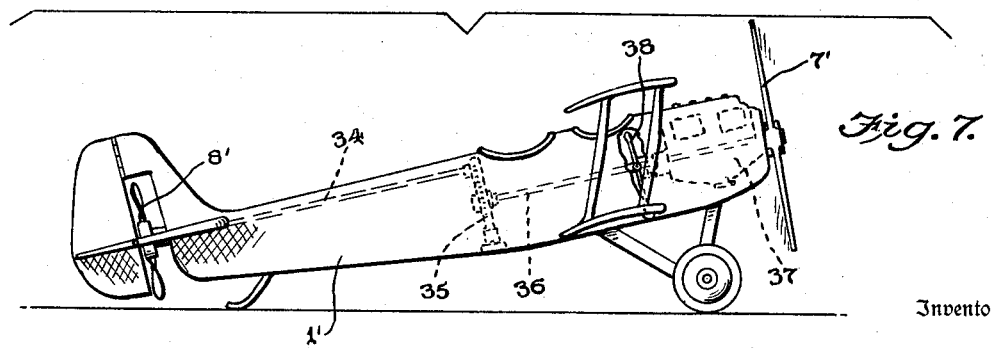
Inventor
J. W. Seiden,
By Linton, Kellogg, Smith
                              Attorneys Patented July 29, 1930

1,771,941

UNITED STATES PATENT OFFICE

JOHN W. SEIDEN, OF LEWISTOWN, MONTANA

AIRPLANE BRAKE

Application filed February 26, 1929. Serial No. 342,741.

This invention relates to improvements in motion retarding or braking means for airplanes, having for an object to provide an airplane with an additional propeller, so mounted with respect to the fuselage and sustaining planes thereof, that with rotation in a given direction, the same will exert a retarding or braking influence upon the forward motion of the airplane, hence, enabling an aviator to effectually control movement of such airplane upon terrain and particularly, facilitating the bringing of an equipped airplane to a full stop upon a landing field after materially shorter runs, thereby allowing landings to be successfully made upon comparatively restricted fields, as well as permitting the braking or stopping of the machine in emergencies occurring either prior or subsequently to a flight and during taxi-ing of the airplane.

Another and equally important object of the invention may be stated to reside in the provision of a braking means of the character mentioned, so mounted that the same will not interfere in any way with normal flight of an equipped airplane and which, is capable of being controlled from a point within the fuselage convenient to the pilot, in order that the braking action created thereby, may be effected at will.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a fragmentary perspective of an airplane equipped with the improved braking mechanism, Figure 2 is an enlarged fragmentary detail, partly in longitudinal section, showing the braking device mounted adjacent the rear end or tail of the airplane fuselage, together with the means for controlling rotation of the same from a remote point, Figure 3 is an enlarged fragmentary detail in vertical section through the hub portion of the improved braking device, Figure 4 is an enlarged fragmentary detail in plan of the rear portion of an airplane showing the mounting of the braking device with respect to the fuselage tail and the plane control devices, Figure 5 is a fragmentary detail in section illustrating the gear means for winding the coiled motor spring of the braking device, Figure 6 is an enlarged fragmentary detail in perspective illustrating the hollow axle for supporting the rotatable air displacing and braking device with respect to the rear or tail end of an airplane fuselage, and Figure 7 is a side elevation of an airplane having a slightly modified form of driving means for the braking device.

Having more particular reference to the drawings, in connection with which like characters of reference will designate corresponding parts throughout, the improved braking device is especially adapted for use in connection with a flying machine of the heavier than air type, commonly known in this art as an airplane, consequently, I have shown for purposes of illustration in this particular embodiment of the invention, the same as being installed upon an airplane, wherein the numeral 1 indicates the fuselage of the machine, the forward portion of which is provided with the usual sustaining planes 2, while the usual types of elevators 3 and a rudder 4 are secured to the rear or tail end of the fuselage and are adapted to be controlled in their operation through the medium of cables, respectively indicated by the numerals 5 and 6, which, as will be understood, are connected to the elevators and the rudder and are operable from within the pilot compartment in the fuselage 1. Also, a propeller, such as indicated by the numeral 7 is mounted upon the forward end of the fuselage 1 and is provided with power from a motor or the like within such fuselage.

The improved braking mechanism may be stated to comprise a rotatable propeller-like device generally indicated by the numeral 8, formed with a hollow or drum-like hub portion 9 adapted to be loosely and rotatably mounted upon a hollow axle 10, which, in turn, is fixedly mounted adjacent the tail end of the fuselage 1 by means of a bracket or similar securing device 11 fixedly connected to an appropriate portion of said fuselage.

This drum-like hub portion 9 of the braking device 8 fixedly carries upon the normally inner side thereof, a spiral gear 12 meshing with a worm gear 13 having rotatable bearing, as at 14 within bearing brackets 15 carried upon a sleeve or collar 16 mounted upon the inner end portion of the hollow axle 10, as is shown in the Figure 6, and fixedly connected to such axle through the medium of a securing pin, bolt or other device 17. In this connection, it is to be noted that one of the bearing portions 14 of the worm gear 13 is provided with a cross-sectionally square shank or extension 18 and that this shank is adapted, at times, to be engaged by the correspondingly shaped wrench portion 19 of a crank handle 20, the purpose of which will be subsequently described. Also, it will be seen, upon reference to the Figures 2 and 5, that the collar 16 is provided with a fixedly mounted arm 21 having a guide opening 22 formed in the free extremity thereof, adapted to receive a ratchet pin 23 through the same and to slidably support it.

To prevent displacement of the rotatable braking device 8 from the hollow axle 10, a locking nut or similar device 24 is engaged with the outer end of said axle and, as shown in the Figure 2, has abutting engagement with the adjacent side wall of the drum-like hub portion 9.

With a view toward providing the rotatable braking device 8 with motive means for imparting rotary force or motion thereto, I arrange within the drum-like hub portion 9, a flat spiral or clock spring designated by the numeral 25, securing one end of said spring, as at 26, to a portion of the hollow axle 10 by passing a screw or similar fastening device into the screw threaded opening 27 formed in said axle, while the opposite or remaining end of the spring 25 is connected to a portion of the inner peripherial wall of said hub, as is indicated by the numeral 28. Thus, it will be seen that by engaging the wrench portion 19 of the crank handle 20 with the squared extension 18 of the worm gear bearing 14, rotary motion may be imparted to the braking device 8 in a direction to place the clock spring 25 under tension. When the desired degree of tension has been secured in the spring 25, the slidable ratchet pin or pawl 23 is caused to engage in an opening, provided therefor in the adjacent side wall of the drum-like hub portion 9 and indicated by the numeral 29. Thus, the rotatable braking device will be held stationary and the spring 25 will be retained in its previously tensioned condition. In this connection, it is to be, of course, understood that any number of these ratchet holes 29 may be arranged in the normally inner side wall of the hub portion 9, in circular relation, such as conditions or preference may dictate.

In order that disengagement of the ratchet pin or pawl 23 from the opening 29 in the hub portion 9 may be effected by the airplane pilot from within his compartment in the fuselage 1, an operating cable 30 is provided and has one end thereof connected to the eyelet portion of the pin or pawl 23, as is shown in the Figure 2, while the cable is then passed longitudinally of the plane fuselage, through an opening 31 therein, into the fuselage to a point in proximity to the pilot compartment, whereat, if desired, it may be provided with a finger piece 32 and may be slidably supported upon a suitable bracket or other device, not shown herein, whereby to effect a definite locating and supporting of the same within such pilot compartment. Consequently upon the povision of this cable 30, it will be understood that the pilot, when desiring to disengage the ratchet pin or pawl 23 from the hub 9, need only engage the finger piece 32 of the cable 30 and pull the same in a direction to effect withdrawal of said pin 23 from the particularly engaged opening 29 in the hub of the braking device 8. At this time, the braking device will be caused to rotate, at high velocity, by reason of the motive force directed thereto from the previously tension clock spring 25.

In this connection, it will be noted, upon reference to the Figures 1 and 2, that the blades of the propeller-like braking device, indicated at this time for convenience by the numeral 33, are arranged at pitches such as will cause a displacement of air in a direction opposite to the normal forward lines of travel of the airplane when under influence of its propeller 7. Because of this, it will be understood that when the ratchet pin 23 is disengaged from the hub portion 9 of said braking device and such device is permitted to rotate under the influence of the motive means 25 at a high velocity, a definite and positive braking action will be set up upon the normally forward line of travel of the equipped air plane and that such plane will therefore be effectually braked.

For convenience in operation of the rudder 4 of the airplane, I may and preferably do pass the operating cables 6, provided therefor, through the hollow axle 10 and into the fuselage 1 to a point whereat they are connected with the usual operating devices within the pilot compartment. Thus, it will be appreciated that the mounting of the rotatable braking device 8 in proximity to the rudder 4, will in no way interfere with normal operation of the latter.

In the Figure 7, I have shown a slightly modified form of driving or motive means for the braking device, such braking device being designated in this particular embodiment by the reference character 8'. Herein, the drive shaft 34 is mounted within and disposed longitudinally of the airplane fuselage 1', said shaft being extended to a point beyond the rear or tail portion of said fuselage and having the rotatable braking device 8' fixedly mounted thereupon. The inner or remaining end of the drive shaft 34 is connected with suitable gearing or power transmission mechanism, so arranged and constructed, that a drive reverse in its direction to the drive of the airplane propeller 7', will be transmitted to the braking device 8'; this power transmitting mechanism, indicated by the numeral 35, being connected by means of a driven shaft 36 to the airplane motor 37 and being adapted to be selectively operated by means of a control lever 38 mounted within the pilot compartment and connected to suitable clutch mechanism (not shown) for connecting or disconnecting said driven shaft to or from said motor 37, as may be desired.

From the foregoing, it will be understood by workers skilled in this particular art, that I have provided a simple yet highly effectual type of motion retarding or braking means for airplanes, whereby the normal forward line of travel of an equipped airplane under momentum, may be definitely braked. Because of this, it will be seen that an airplane equipped with the invention may be caused to effect successful landing upon a field of comparatively restricted size, inasmuch as with landing of the airplane upon terrain, the braking device may be placed in operation by the plane pilot, whereupon it will exert a positive retarding force with respect to the normal forward lines of travel of the machine.

Obviously, the size or length of the motor spring 25, may be varied, according to the particular time or duration for which it is desired to rotate the braking device 8 and likewise, it is to be understood that, if desired, the manually operable means for tensioning the motor spring 25 within the drum-like hub portion 9, may be varied.

Manifestly, the construction shown is capable of considerable modification, and such modification as is within the scope of my claims I consider within the spirit of my invention.

I claim:—

1. In an airplane, rotatable air displacing means mounted adjacent a portion of the fuselage, adapted, with rotation, to exert a braking influence upon the normal forward line of motion of said airplane, automatic means contained within said rotatable air displacing means for imparting rotary motion thereto, and means for controlling operation of said automatic means.

2. In an airplane, a rotatable air displacing means mounted adjacent a portion of the fuselage adapted, with rotation, to exert a braking influence upon the normal forward line of motion of said airplane, spring means contained within said air displacing means adapted to be placed under tension, at times, and means for controlling rotation of said air displacing means by the spring means.

3. In an airplane, a rotatable air displacing device mounted adjacent the rear end of the airplane fuselage and comprising air displacing blades and a casing-like hub portion, an axle for rotatably supporting said air displacing means with respect to the fuselage, spring means arranged within said casing-like hub portion having one end connected thereto and the opposite end connected to said axle for transmitting rotary motion to the air displacing means, at times, and means operable from a remote point for controlling operation of said spring means.

4. In an airplane, a rotatable air displacing means mounted adjacent a portion of the fuselage, adapted, with operation, to exert a braking influence upon the normal forward line of motion of said airplane, said air displacing means being formed with a central chamber, motive means mounted within said chamber and adapted to normally urge said air displacing means into a rotary motion, and means for holding said air displacing means against the normal action of said motive means.

5. In an airplane, an air displacing device rotatably mounted adjacent a portion of the fuselage comprising relatively opposed blades and a drum-like hub portion, motive means contained within said drum-like hub portion normally acting upon the air displacing device for transmitting rotary motion thereto, and means engageable with said air displacing device for holding the same against the normal action of said motive means.

6. In an airplane, air displacing means mounted adjacent a portion of the fuselage adapted, with operation, to exert a braking influence upon the normal forward motion of said airplane, motive means normally acting upon the air displacing means for transmitting rotary motion thereto, and means engageable with said air displacing means for holding the same against the normal action of said motive means.

In witness whereof I have hereunto set my hand.

JOHN W. SEIDEN.